June 23, 1970  H. M. WHITLOCK ET AL  3,516,440
CONTROL VALVE FOR DIRECTING THE FLOW OF GASES
Filed Feb. 14, 1968  2 Sheets-Sheet 1

INVENTORS
HUBER M. WHITLOCK
DOUGLAS M. BARTLEY
RICHARD E. TORONGO

BY Cullen, Sloman, & Cantor

ATTORNEYS

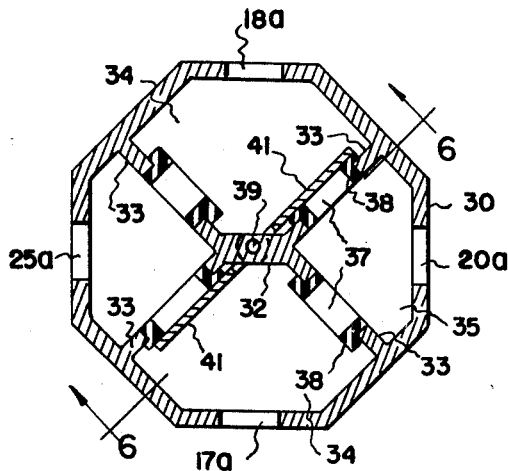
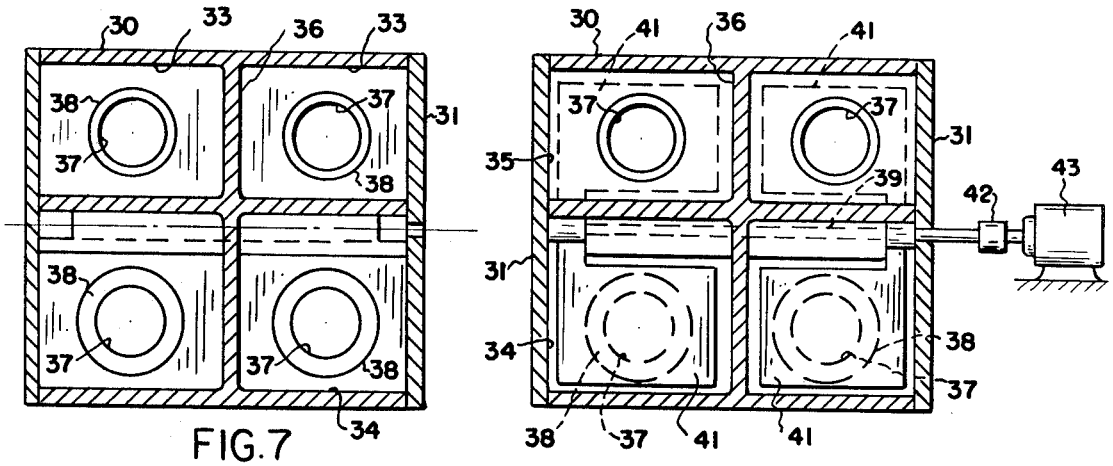
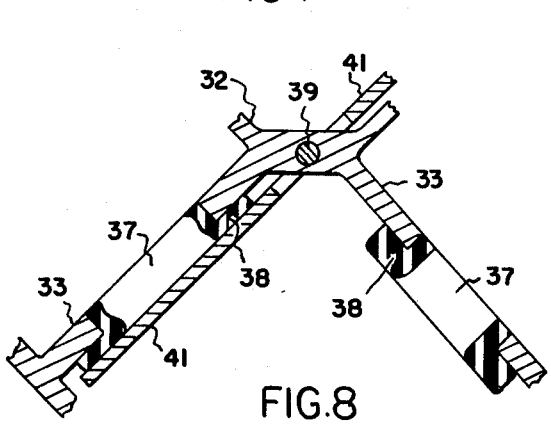
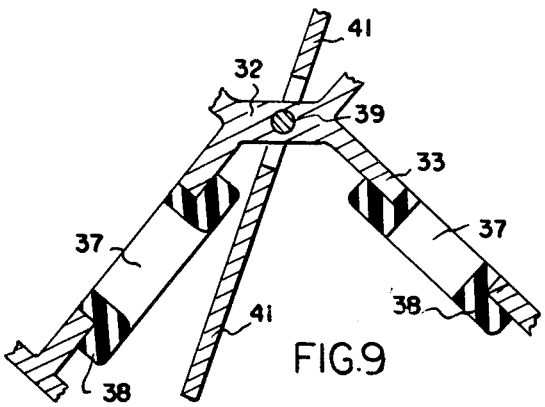

United States Patent Office
3,516,440
Patented June 23, 1970

3,516,440
CONTROL VALVE FOR DIRECTING THE FLOW OF GASES
Huber M. Whitlock, Rochester, Douglas M. Bartley, Detroit, and Richard E. Torongo, Livonia, Mich., assignors to C.H.W. Inc., Oak Park, Mich., a corporation of Michigan
Filed Feb. 14, 1968, Ser. No. 705,452
Int. Cl. F16k *11/02*
U.S. Cl. 137—625.44                  2 Claims

ABSTRACT OF THE DISCLOSURE

A control valve for directing the flow of gases, such as hot air, comprising a unitary, relatively rough surfaced, cast body, having a thin wall octogonal shaped, a central spline, approximately radially directed walls connecting the spline to the body wall, and with the ends of the body closed off. An opening is formed in each wall and through the body wall into each chamber formed by the adjacent walls. A shaft rotatably extends through the spline and carries a pair of radially extending flaps which extend into two opposite chambers for rotating towards one or the other of their chamber walls to cover the openings therein. The openings have resilient surrounding gaskets, surface contacted and compressed by the flaps. The shaft, with the flaps, are constantly driven by a reversible, constantly rotating, stallable electric motor which constantly forces the flaps in one or the other direction to compress and seal against one pair of gaskets, but with the compressed gaskets resiliently expanding and pushing the flaps, and the motor, in the opposite direction when the motor is reversed.

BACKGROUND OF INVENTION

In dehumidifiers and dryers used for dehumidifying and drying large quantities of air and the like gases, and in similar types of equipment, control valves are used to cycle the air through the various dehumidifier chambers, etc. In the past, these control valves have been relatively large, expensive and complicated.

Particularly, since the valves are used to control and to divert gases, such as air, sealing problems have arisen which have required fine machining of mating surfaces, expensive seals and the like.

SUMMARY OF INVENTION

It is an object of this invention to provide a control valve for diverting and controlling the flow of gases, such as hot air, but utilizing a simple and inexpensive casting, having the usual relatively rough cast surfaces, eliminating the need for machining and finishing mating surfaces and utilizing a simple, inexpensive sealing and control means.

More specifically, this invention contemplates forming a cast valve body, such as with eight chambers, in pairs of four, each radially arranged around a central axis, with rotatable flaps arranged in opposing chambers and arranged to seal against a highly resilient gasket, with the flaps being constantly rotated and driven by a reversible, stallable electric motor which constantly exerts a force upon the flaps to seal them against the gaskets, but with the gaskets exerting a counterforce to drive the flaps and the motor in the opposite direction immediately upon reversal of the motor direction.

Still a further object of this invention is to utilize a rough cast valve body, simple sealing flaps sealing against resilient relatively crude gaskets, and driven by an electric motor characterized by being constantly operated, but stallable upon meeting resistance, that is, a motor which tends to continue rotation even though prevented from rotating without burning out to thereby exert a constant sealing force between the flaps and the gasket.

In this manner, the valve can be formed out of unusually simple, inaccurate, rough surfaced parts, yet remain gas tight, avoid leakages, yet almost instantly operate as required.

These and other objects and advantages of this invention will become apparent upon reading the following description of which the attached drawings form a part.

DESCRIPTION OF DRAWINGS

In the attached drawings:

FIG. 5 is an end view of the valve, with the cover removed and shown in cross-section.

FIG. 6 is a cross-sectional view taken in the direction of arrows 6—6 of FIG. 5, and FIG. 7 is a view similar to FIG. 6, but with the control valves removed.

FIGS. 8 and 9 are enlarged cross-sectional views of a fragmentary portion of the valve, showing the operation of the control flaps in sealing against the sealing gaskets.

DETAILED DESCRIPTION

Figure 1:
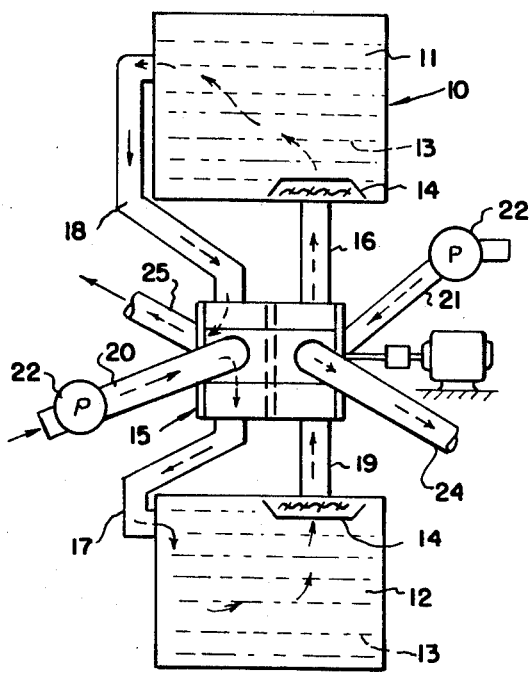
FIG. 1 is a schematic, elevational view of a typical dehumidifier and dryer utilizing the valve herein.
Figure 2:
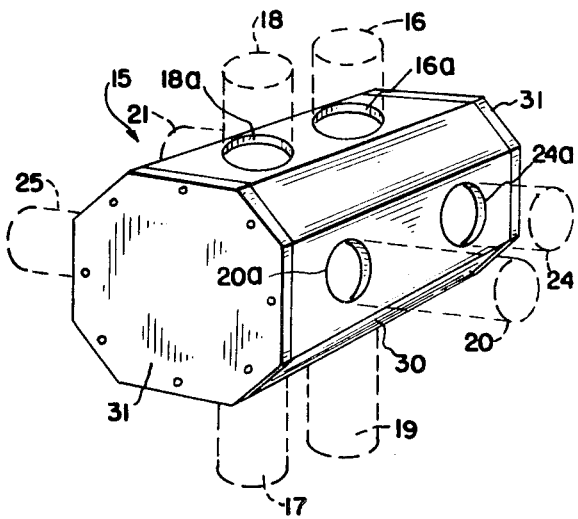
FIG. 2 is a perspective view of the valve per se.

FIG. 1 illustrates schematically, a dehumidifier and dryer used for air to be used in an industrial process, such as in connection with molding plastic and in mixing with and conveying plastic powders before molding.

The apparatus includes an upper desiccant tank 11, a lower desiccant tank 12, each filled with a suitable chemical desiccant 13 and each containing a suitable heater element 14 to heat the incoming air.

The control valve 15, to which this invention relates, is connected to the upper tank by an inlet pipe 16 and to the lower tank by an inlet pipe 17. In addition, outlet pipes 18 and 19 connect the upper and lower tanks, respectively, to the valve.

A fresh air inlet pipe 20 and a second inlet pipe 21, each having suitable air pumps 22 are also connected to the valve.

The valve is provided with a dehumidified and dried air outlet 24 through which the processed air passes and an exhaust air outlet 25 through which the air which is used to dry the desiccant passes.

The general operation of the above described apparatus is as follows: Fresh air is pumped through inlet pipe 20, through the valve, downwardly through intake pipe 17 and through the lower desiccant tank 12 where the air is dehumidified and dried. The air then passes through the outlet pipe 19, back through the valve and out through the outlet or delivery pipe 24. Meanwhile, air is also passed through the inlet pipe 21 through the valve (shown in dotted lines), upwardly through the inlet pipe 16 and through the upper desiccant tank 11, where this air which is now heated, such as by the heater 14, removes the moisture collected in the upper tank 11. The moisture laden air now passes out through the outlet pipe 18, through the valve, and out to atmosphere or for reuse through the outlet pipe 25. Thus, the lower tank is now used to provide dehumidified and dried air while the upper tank is being processed by being dried out.

After a suitable period of time, the valve reverses the flow so that the upper tank provides the needed dehumidified and dried air, while the lower tank is dried out and the cycle continuously alternates.

The key to the smooth and continuous operation of the foregoing apparatus, and particularly, its cost of construction and cost of maintenance is the valve itself. This valve 15 is formed of an octogonal shaped valve body 30 preferably formed as a unitary casting with thin walls, but unfinished so that they are rough as is typical in a cast metal part. The ends of the valve body are closed off by closure plates 31 which are suitably sealed and fastened thereto.

Figure 3:
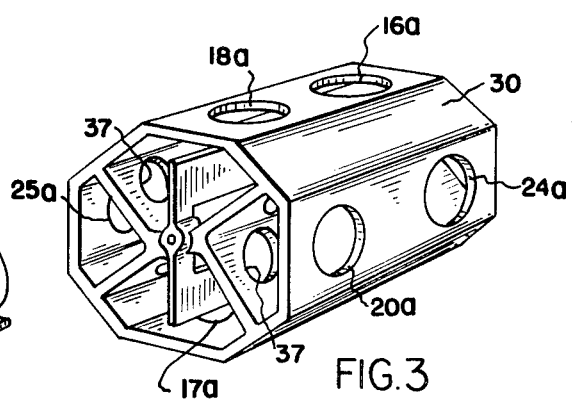
FIG. 3 is a perspective view of the valve with one of its end covers removed.

As illustrated in FIGS. 3 and 5, a central spline 32 extends the length of the valve body and radial walls 33 connect the spline to the walls of the outer body to thereby form upper and lower control chambers 34 and side chambers 35. As shown in FIG. 3, four chambers are created by the radial walls. However, as illustrated in FIGS. 6 and 7, a central divider wall 36, divides the body into two sets of four chambers each, thus producing eight chambers.

Each of the chamber walls are provided with interconnecting openings 37. In addition, each chamber is provided with an opening through the outer valve body wall to correspond to the respective inlet and outlet pipes and these openings are labeled in accordance with their respective pipes, such as opening 20a receiving pipe 20, opening 16a, receiving pipe 16, etc.

Each of the openings 37 in the radial walls, is surrounded by a highly resilient, thick gasket 38 formed of a suitable synthetic rubber material.

A shaft 39 extends centrally through the spline 31 with the opposite ends of the shaft having bushings 40 immovably secured thereto and fitted into cut out portions at the ends of the spline.

Figure 4:
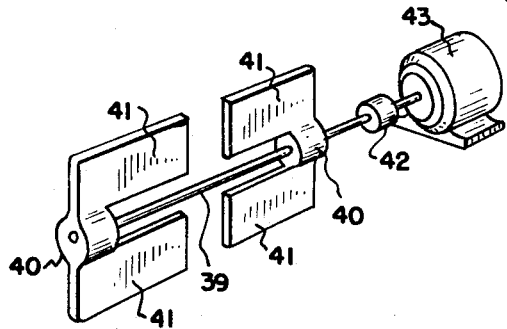
FIG. 4 is a perspective view of the control flaps and shows their connection to the electric drive motor.

Upon these bushings 40, valve flaps 41 are secured (see FIG. 4). These flaps are in effect, flat plates of a large enough size to cover the wall openings in their respective chambers. In addition, as can be seen in FIG. 5, the chamber defining walls are slightly off set relative to the radial so that the flat surfaces are arranged closely parallel to the corresponding wall surfaces against which they seal. FIG. 8, illustrates this arrangement of off radial location of the walls as compared with the radial arrangement of the flaps.

The shaft 39 is coupled by a suitable coupling 42 to an electric motor 43. This motor is characterized by being reversible, constantly rotating, that is, constantly on, but being stallable. That is, upon reaching an obstacle against further rotation, the motor remains on, without burning out, and continues to exert a rotative torque so that it in effect continues to want to rotate until such time as its current is turned off or it is reversed.

Thus, the motor rotates the flaps and also continues applying a torque to the flaps to press the flaps into tight contact with the sealing gaskets surrounding the wall openings.

OPERATION

In operation, the motor 43 is actuated to rotate the flaps 41 in one direction in which the flaps seal against an opposite pair of gaskets 38 and compress these gaskets and tightly press against them due to the torque of the motor. Although the motor stops rotating upon compression of the gaskets, it nevertheless, continues to exert a torque maintaining the flaps 41 in tight face to face engagement with the resilient gasket 38. During that time, the air is directed through the unsealed openings 37.

Aftet a predetermined period of time, when the cycle through the desiccant tanks is to be reversed, the motor 43 is reversed by a suitable reversing switch (conventional and therefore not shown). The instantaneous removal of torque from the flaps 41 results in the decompression or expansion of the compressed gaskets 38 to exert a counterforce or torque upon the flaps and immediately push them into a counter rotation, thereby counterrotating the motor to start its rotation in the opposite direction. Thus, there is an almost immediate reaction to reversing the motor or shutting off its current which prevents sticking or slow response of the flaps and motor. At the same time, when the motor is shut off completely, as for example when the apparatus is not to be used, the expansion action of the gaskets prevents the gaskets from taking a permanent set by moving the flaps away from them during non-use periods.

This invention may be further developed within the scope of the following claims. Accordingly, it is desired that the foregoing description be read as being merely illustrative of an operative embodiment of this invention and not in a strictly limited sense.

Having fully described an operative embodiment of this invention, we now claim:

1. A control valve for directing gas flow comprising:
   a chamber formed of two angularly directed valve walls generally forming a V-shape and integrally joined together at the apex of the V-shape by a continuous spine portion extending the full length of the valve walls, but having an end spaced slightly short of one end of said walls, and an outer wall closing the wide end of the V-shape and opposite end walls closing the ends of the chamber;
   a valve control shaft journalled through and rotatably supported within a central opening extending the length of said spine portion;
   an L-shaped valve vane in the form of a thin, flat plate arranged within said chamber and spaced between the spine and outer wall, with one end of the plate having an integral leg portion having a free end closely, but rotatably fitted into the space defined by said spline and its adjacent end wall, and connected to said shaft for rotation therewith;
   and an opening formed in each of the valve walls, with means for rotating the shaft for rotating the vane into close relationship with either of the two valve walls for closing off the opening therein.

2. A control valve as defined in claim 1 and including a second chamber arranged radially opposite to the first chamber and substantially identical thereto;
   and a second, substantially identical vane, arranged in the plane of the first vane, but within the second chamber and having its leg integrally joined to the leg end of the first mentioned vane for rotating therewith for closing the openings in the valve walls of the second chamber.

References Cited

UNITED STATES PATENTS

| 3,269,414 | 8/1966 | Mayo | 137—625.43 |
| 3,307,583 | 3/1967 | Harter | 137—625.43 |

FOREIGN PATENTS

| 24,907 | 5/1908 | Great Britain. |

M. CARY NELSON, Primary Examiner

MICHAEL O. STURM, Assistant Examiner